United States Patent [19]

Thurman

[11] Patent Number: 4,629,020
[45] Date of Patent: Dec. 16, 1986

[54] STEERABLE DEVICE FOR MOVING TRAILER TYPE VEHICLES

[75] Inventor: Brian Thurman, Sheffield, England

[73] Assignee: Craven Tasker (Sheffield) Limited, England

[21] Appl. No.: 739,079

[22] Filed: May 29, 1985

[30] Foreign Application Priority Data

Apr. 19, 1985 [GB] United Kingdom ............... 8510056

[51] Int. Cl.⁴ ............................................ B62D 51/04
[52] U.S. Cl. ................... 180/19.2; 180/19.3; 180/275; 180/279; 180/332; 280/421; 280/DIG. 11
[58] Field of Search ............. 180/19.1, 19.2, 19.3, 180/904, 14.1, 274, 275, 332, 279; 280/420, 421, DIG. 5, DIG. 11, 476 R

[56] References Cited

U.S. PATENT DOCUMENTS 2,879,858  3/1959  Thomas ........................... 180/19.2
2,902,105  9/1959  Wiley ............................... 180/19.3
3,024,858  3/1962  Davis ............................... 180/19.2
3,254,900  6/1966  Allen ............................... 180/14.1
3,370,666  2/1968  Holtzclaw ....................... 180/14.1
4,081,047  3/1978  Lovell ............................. 180/19.3

FOREIGN PATENT DOCUMENTS

2370604  7/1978  France ............................. 180/19.2

Primary Examiner—John J. Love
Assistant Examiner—Everett G. Diederiks
Attorney, Agent, or Firm—Larson & Taylor

[57] ABSTRACT

A steerable device for moving trailer type vehicles, for example in working and parking areas. The device includes an engine for driving at least one of the wheels, means for connecting the device to that part of a trailer type vehicle normally connected to the fifth wheel connection of a tractor unit, and tiller steering for turning a steerable wheel or wheels. The device also includes an air compressor driven by the engine and a flexible connection provided with a quick-release adaptor for coupling the air compressor to the braking system of a trailer type vehicle for releasing its brakes.

3 Claims, 7 Drawing Figures

STEERABLE DEVICE FOR MOVING TRAILER TYPE VEHICLES

FIELD OF THE INVENTION

The invention relates to a steerable device for moving trailer type vehicles.

It has been a particular problem for manufacturers of trailer type vehicles, but also for users of such vehicles, that for moving such vehicles about their working or parking areas they have needed at least one tractor unit always on hand. Such tractor units themselves take up a fair amount of space, are not always easy to maneuver into position for the coupling up of a trailer and, if reasonably new, represent a considerable financial outlay for what can only be regarded as a non-productive work unit. If a very old and therefore inexpensive tractor unit is used for this sort of work, it will often be difficult to start and may turn out a great deal of smoke and fumes.

A further problem in connection with the operation of a trailer type vehicle is that when parked for any length of time on a dockside for example, the vehicle brakes, which are invariably air brakes which are released by pneumatic pressure, will be on. Then it is very usual for dockside workers to move such vehicles around from time to time by the simple expedient of dragging them with wheels locked by the use of very powerful equipment. Obviously, such movement of a heavily loaded trailer type vehicle does a great deal of damage to the tires, this being not only an economic loss to the vehicle owner but a possible serious road safety hazard if an already well worn tire is abused in this way.

OBJECT OF THE INVENTION

The object of the invention is to provide a remedy and seeks to solve the problem of how to move trailer type vehicles around in relatively confined parking areas and without damage to the tires.

SUMMARY OF THE INVENTION

According to the invention, there is provided a steerable device including a frame provided with at least three wheels; an engine for driving at least one of said wheels; a tiller for turning a steerable wheel or wheels of the device; means whereby the device can be connected to that part of a trailer type vehicle normally connected to the so-called fifth wheel connection of a tractor unit, for the weight of the front end of the trailer to be supported by the device; an air compressor driven by the engine; and a flexible connection provided with a quick-release adaptor for coupling the air compressor to the braking system of a trailer type vehicle for releasing its brakes. The means whereby the device can be connected to a trailer type vehicle may be constituted by a bearing sleeve trunnion mounted to one end of a carrier, the latter being pivotally connected at its other end to the frame, means being provided for lifting the carrier relative to the frame so that the bearing sleeve can be engaged with the usual coupling pin of the trailer and can then lift the front end of the trailer. The lifting means provided may be constituted by at least one hydraulic ram. The or each driving wheel may be drivable by a hydraulic motor to which oil under pressure can be delivered from a pump drivably connected to the engine. The tiller for turning the steerable wheel or wheels of the device will preferably carry valve means at its front end, a lever for opening and closing the valve means to a flow of oil in opposite directions through flow and return pipes extending along the tiller being operable by a person steering the device to cause the hydraulic motor or motors to be driven in either direction so that the device can be power driven in either a forward or reverse direction. The tiller will preferably carry safety means for preventing a person steering the device from becoming trapped thereby, the safety means including a forwardly extending buffer element slidably mounted relative to the tiller and being displaced against the force of spring means on contacting an obstruction to cut off drive to the at least one power driven wheel. For example, the displacement of the buffer element against the force of the spring means relative to the tiller may be effective to actuate a micro switch which immediately cuts off drive to the at least one power driven wheel.

DESCRIPTION OF PREFERRED EMBODIMENTS

Figure 1:
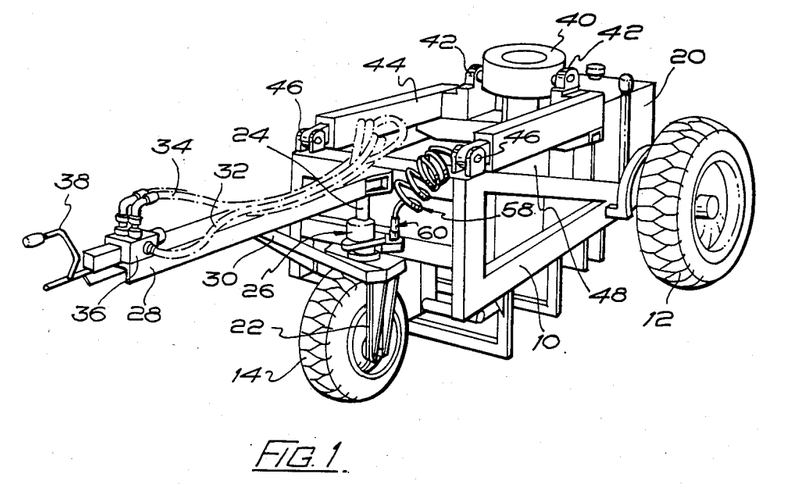
FIG. 1 is a perspective view of a device embodying the invention.
Figure 2:
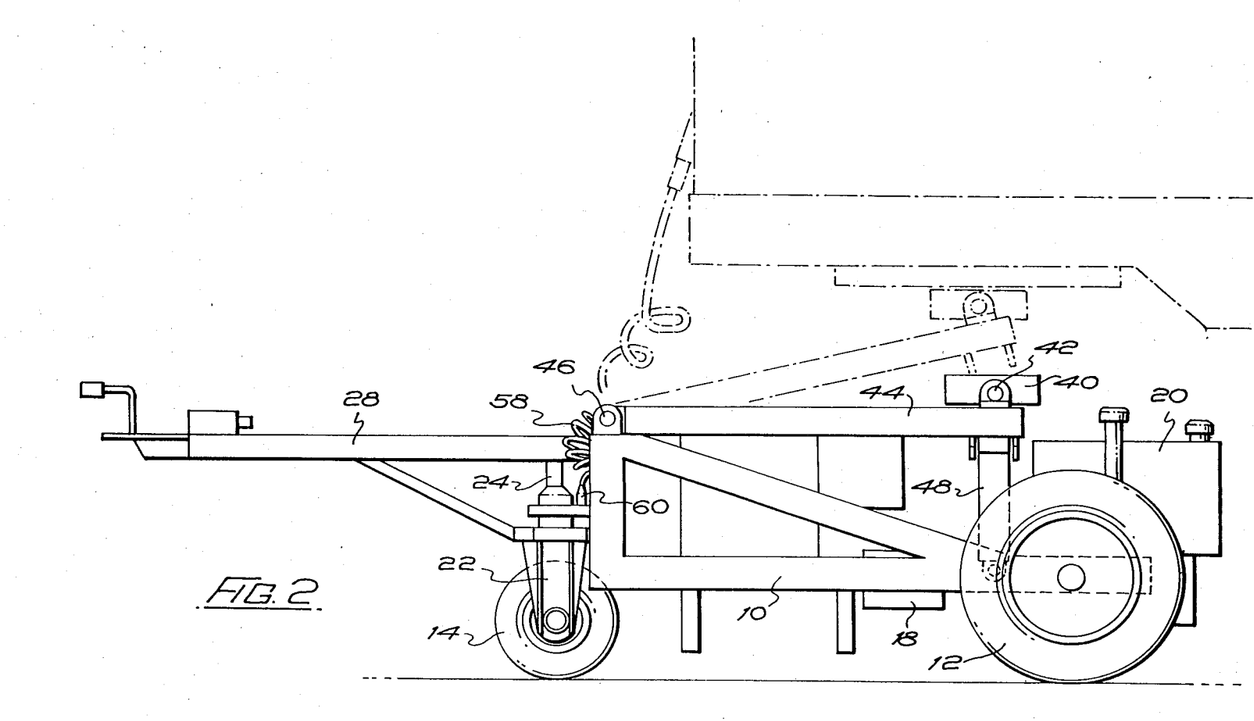
FIG. 2 is a side view.
Figure 3:
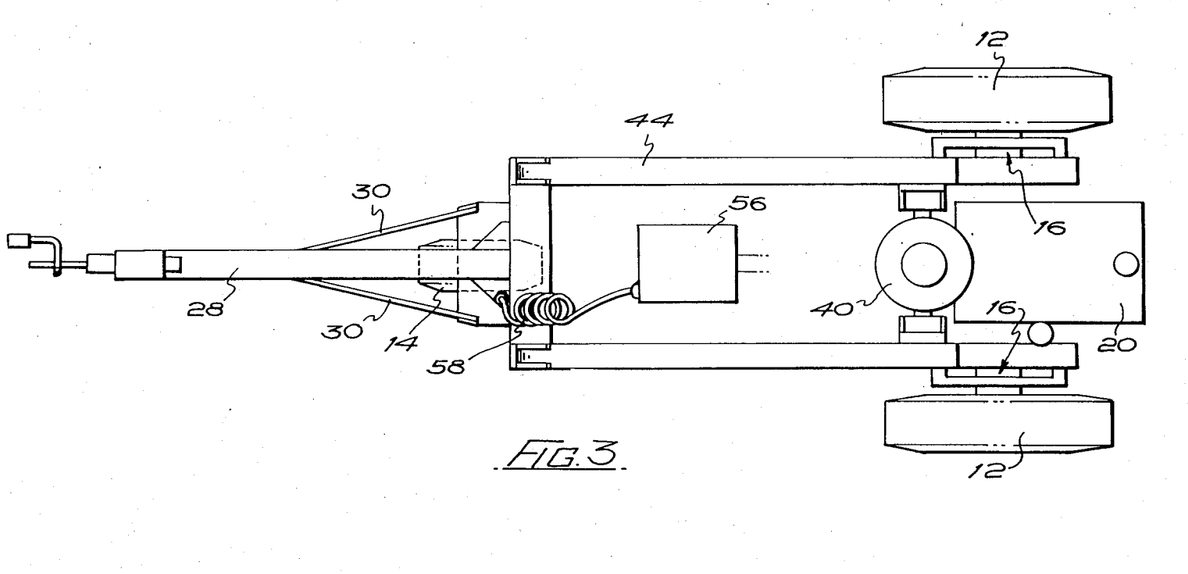
FIG. 3 is a plan view.

Referring now to FIGS. 1 to 3, the device there illustrated has a welded steel frame 10 provided with a pair of rearwardly disposed driving wheels 12 and a forwardly disposed steerable wheel 14. The driving wheels 12 are drivable by hydraulic motors 16 to which oil under pressure is delivered from a pump 18 driven by a diesel engine 20.

The steerable front wheel 14 is rotatably mounted in a steering fork 22 which is carried at the lower end of a pivot pin 24 mounted in bearings in structure 26 projecting from the front of the frame. A tiller 28 for steering the device is connected to the pivot pin 24 and is braced by means of inclined support struts 30 connected to the steering fork 22. Flow and return pipes 32, 34 extend along the tiller to valve means 36 carried at its front end. A lever 38 for opening and closing the valve means to the flow of oil under pressure in opposite directions through the flow and return pipes can be operated by a person steering the device to cause the hydraulic motors to be driven in either direction so that the device can be power driven in either a forward or reverse direction. When the lever is in a neutral position, to which it returns automatically when released by the person operating the vehicle, there is hydraulic lock in the system so that the device is immovable in either direction. The device does not therefore require brakes.

The device is provided with means whereby it can be connected to a trailer type vehicle beneath that part of the trailer normally connected to the so-called fifth wheel connection of a tractor unit. These means are constituted by a bearing sleeve 40 trunnion mounted at 42 to one end of a carrier 44, the latter being pivotally connected at 46 to the frame 10. A hydraulic ram 48 is pivotally connected beneath the carrier at that end which supports the bearing sleeve 40, the ram reacting against a lower part of the frame 10. The arrangement is such that when the device has been maneuvered, as previously described, so that the bearing sleeve 40 is almost exactly beneath the depending coupling pin of the trailer which it is desired to move, the output of the pump 18 can be diverted to the hydraulic ram 48 (by valve means not shown) so that the bearing sleeve is brought into engagement with the coupling pin and then lifts the front end of the trailer.

The device is also provided with an air compressor 56 and with a flexible connection 58 for coupling the air compressor to the braking system of a trailer type vehicle for releasing the brakes. The flexible connection 58 which is shown as a coil of tubing in the drawings, is provided with a quick-release adaptor 60 by means of which it can quickly be connected to the usual braking system connector of a trailer vehicle as shown in chain-dotted lines in FIG. 2. Until it is to be connected to a trailer vehicle, the adaptor 60 is connected to a dummy connector on the frame of the device.

The device is such that when it has been connected to a trailer vehicle as described and the trailer brakes rendered inoperative by air pressure admitted to the trailer braking system, the coupled combination can be maneuvered very easily indeed and with much greater safety than when using a conventional tractor unit. This is because a person operating the device has excellent visibility underneath and around the sides of the trailer. It will be understood that such a device is only required to operate at a walking speed. Consequently, it can have a relatively small engine and can operate very quietly. The device is very compact and of very much smaller overall size than a conventional tractor unit and can therefor be much more easily parked out of the way when not in use.

Referring now to FIGS. 4 to 7 of the drawings, the modified device there illustrated is very similar to that previously described in that it has a welded steel frame 10, a pair of rearwardly disposed driving wheels 12 and means whereby it can be connected to a trailer type vehicle, these means being constituted by the bearing sleeve 40 trunnion mounted at 42 to the carrier 44, the latter being pivotally connected at 46 to the frame. However, the device is provided with a pair of hydraulic rams 48, these being powered by a pump 18 driven by an engine 20. Also, in this case the engine is mounted towards the front of the device and the bearing sleeve 40 is located further forwardly than before for reasons of safety, that is to say to reduce the risk that the front end of the device might rear up when pulling a heavy trailer.

Figure 4:
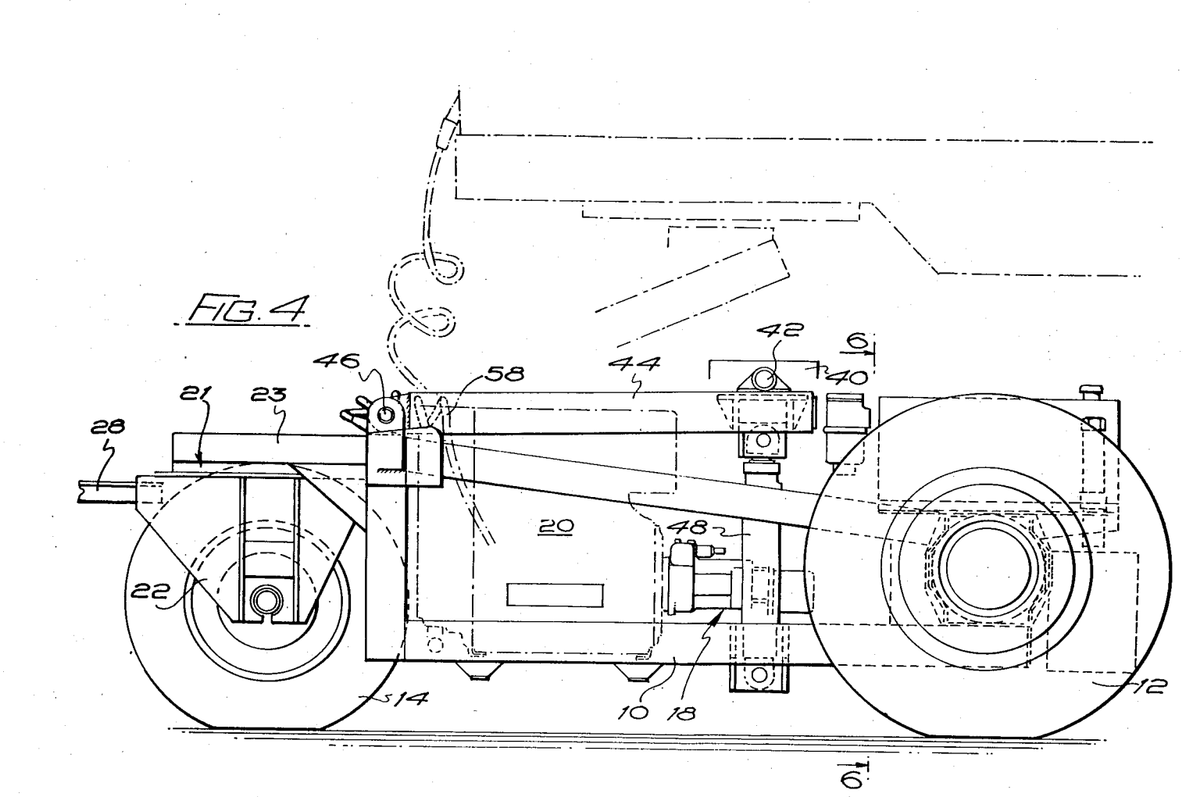
FIG. 4 is a view similar to FIG. 2 and illustrating a somewhat modified device embodying the invention.
Figure 5:
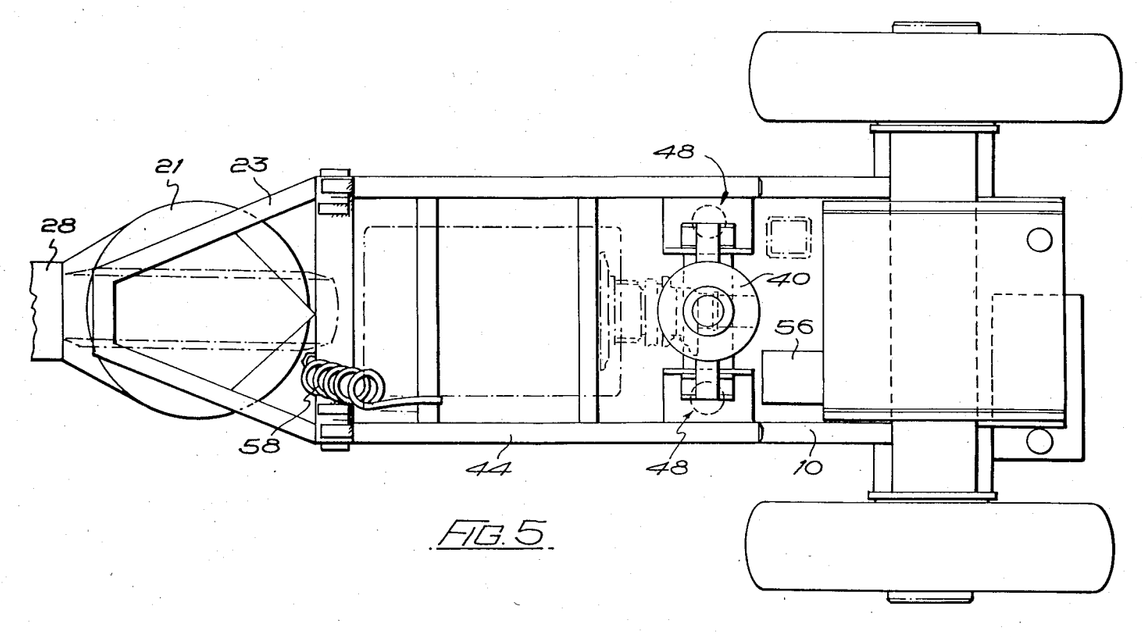
FIG. 5 is a plan view of the modified device depicted in FIG. 4.
Figure 6:
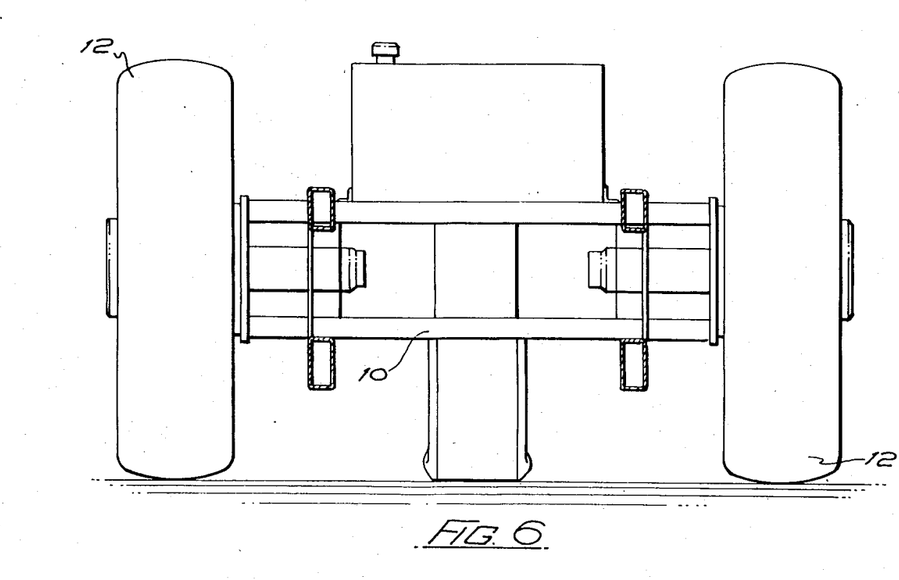
FIG. 6 is a sectional view on the line 6—6 in FIG. 4.

A further variation from the previously described device is the fact that the single front wheel is of somewhat larger size and is carried in a steering fork 22 which is mounted in a slewing ring 21 beneath a forwardly projecting structure 23 forming part of the frame.

Figure 7:
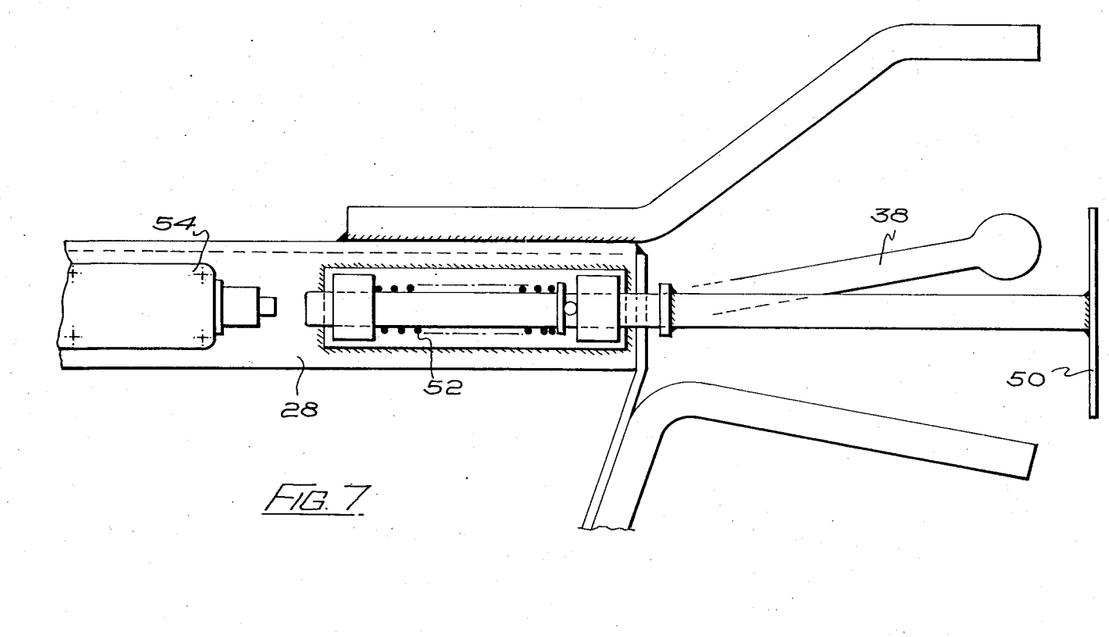
FIG. 7 is a side view of a front end of a tiller part of the modified device shown in FIG. 4.

Referring now to FIG. 7, the tiller of the modified device is shown to carry safety means for preventing a person steering the device from becoming trapped thereby. The safety means include a forwardly extending buffer element 50 which is slidably mounted relative to the tiller. The arrangement is such that on contacting an obstruction, which may of course be the body of the person steering the device, the buffer element is displaced against the force of a spring 52 and actuates a micro switch 54 to cut off the drive to the power driven wheels 12. (The drive to the power driven wheels can of course be cut off in a number of ways. For example, the actuation of the micro switch may be arranged to stop the engine or may be arranged to bring about hydraulic lock in the hydrostatic transmission. It may at the same time be arranged to apply a brake or to engage a mechanical lock in the drive transmission). The addition of the displaceable buffer element does not of course interfere with the movement of the lever 38 for opening and closing the valve means which cause the hydraulic motors to be driven in either direction as required.

Various other modifications may be made. For example, although the hydraulic transmission of the device described and illustrated is capable of braking the device, it may be thought desirable to fit the device with braking means acting on the transmission mechanism and/or with conventional brakes acting on at least one of the wheels or on at least a pair of the wheels to be operated by a manually operable lever. The device can of course be fitted either with a diesel engine or with a gasoline engine.

What I claim and desire to secure by Letters Patent is:

1. A pedestrian controlled steerable device comprising:

a frame provided with at least three wheels;

an engine;

a lift means for connecting the device to that part of a trailer type vehicle normally connected to the so-called fifth wheel connection of a tractor unit and for supporting the weight of the front end of the trailer, the lift means comprising a bearing sleeve having a central vertical aperture, a carrier, and a trunnion mounting means for trunnion mounting said bearing sleeve to one end of the carrier, the carrier being pivotally connected at its other end to the frame;

at least one hydraulic ram for lifting the carrier relative to the frame so that the aperture in the bearing sleeve is adapted to receive the usual coupling pin of the trailer and the bearing sleeve can then lift the front end of the trailer;

an air compressor driven by the engine;

a flexible connection provided with a quick-release adaptor for coupling the air compressor to the braking system of a trailer type vehicle for releasing its brakes;

a hydraulic pump driven by the engine and delivering oil under pressure to at least one hydraulic motor for driving at least one of the wheels;

a tiller for turning at least one steerable wheel of the at least three wheels;

valve means connected to the free end of the tiller; and a manually operable lever for opening and closing the valve means to the flow of oil in opposite directions through flow and return pipes extending along the tiller, the lever being operable by a person steering the device to cause the at least one hydraulic motor to be driven in either direction so that the device is power driven in either a forward or reverse direction.

2. A steerable device as claimed in claim 1, in which the tiller carries safety means for preventing a person steering the device from becoming trapped thereby, the safety means including a forwardly extending buffer element slidably mounted relative to the tiller and projecting forwardly beyond the front end of the tiller and immediately beyond said manually operable lever being displaceable against the force of spring means on contacting an obstruction to cut off drive to the at least one power driven wheel.

3. A steerable device as claimed in claim 2, in which the displacement of the buffer element against the force of the spring means relative to the tiller is effective to actuate a micro switch which immediately cuts off drive to the at least one power driven wheel.

* * * * *